United States Patent
Breglia et al.

[11] 3,958,860
[45] May 25, 1976

[54] HOLOGRAPHIC OBJECT RECOGNITION TRAINER

[75] Inventors: Denis R. Breglia, Altamonte Springs; Alfred H. Rodemann, Maitland, both of Fla.

[73] Assignee: The United States of America as represented by the Secretary of the Navy, Washington, D.C.

[22] Filed: Dec. 9, 1974

[21] Appl. No.: 530,790

[52] U.S. Cl. .................... 350/3.5; 35/12 N; 350/285; 353/11
[51] Int. Cl.² .................... G03H 1/30; G03B 21/00
[58] Field of Search ............ 350/3.5, 285; 35/12 N; 353/11, 25, 26

[56] References Cited
UNITED STATES PATENTS

| | | | |
|---|---|---|---|
| 3,600,055 | 8/1971 | Emerick | 350/3.5 |
| 3,632,181 | 1/1972 | Lee | 350/3.5 |
| 3,700,302 | 10/1972 | Mohon et al. | 350/3.5 |

OTHER PUBLICATIONS
Jeong et al., Jour. of the Optical Society of America, Vol. 56, No. 9, Sept. 1966, pp. 1263–1264.

*Primary Examiner*—Ronald J. Stern
*Attorney, Agent, or Firm*—Richard S. Sciascia; John W. Pease

[57] ABSTRACT

Apparatus and method for the visual display of an object, such as an aircraft, at continuously variable attitudes comprising two hologram films of the object made in wrap-around 360° fashion on axes through the object and normal to each other to store object images comprising a complete spherical view of the object and the provision of scanners, a laser beam source, reflectors and an instructor's control panel of amplifiers and switching circuits to direct the laser beam to the film having the view desired and at an xy address on the film at which the desired view is located and a display screen for viewing the selected image or series of continuously variable images.

4 Claims, 3 Drawing Figures

HOLOGRAPHIC OBJECT RECOGNITION TRAINER

BACKGROUND OF THE INVENTION

The invention relates to the fields of display systems and holography and relates particularly to the provision of visual displays for the purpose of recognizing and identifying objects such as planes, ships, tanks and the like from any angle of attitude.

Under conventional practice instruction takes place in a classroom environment wherein an instructor points out salient characteristics of an aircraft, for example, to be identified, using models, photographs or possibly projected vu-graphs of the aircraft. In using this technique, approximately 10 photographs of each aircraft are required to give the student a reasonably complete view of the aircraft, i.e., top side, bottom, right side, left front quarter, etc. The procedure used to make the photograph is to first build up a small scale model of the aircraft and then to photograph this model against sky backgrounds with the aircraft model in the various attitudes required.

Disadvantages of the above described procedure is the need for 10 or more photographs to produce an end result which is still a limited number of views of the object. A desirable end would be to obtain continuous unlimited views of the object as if it were at the center of a sphere and one could observe the object from all points of longitude and latitude on the sphere. However, the cost and bulk associated with actual scale models is prohibitive. Objectives of applicants' invention is to provide the desired result of continuous spherical views of an object while eliminating the need for scale models in presentation and also eliminating the current costs of multiple photographs and its limited effectual results.

SUMMARY OF THE INVENTION

In accordance with the invention the need for 10 or more photographs or transparencies or the use of actual models are replaced with two holograms taken about axes through the object and normal to each other to provide continuously variable angles of view which include all possible angles of view of the object, together with a laser beam source, reflectors and xy optical scanners for directing the laser beam to the holograms to project an image thereof on a display screen and an instructor's control panel including dual channel amplifiers and variable resistance switching circuits for applying selective voltages to the scanners as a means of directing the scanners selectively to portions of each hologram corresponding to the desired attitude view of the object.

DESCRIPTION OF THE PREFERRED EMBODIMENTS

Figure 1:
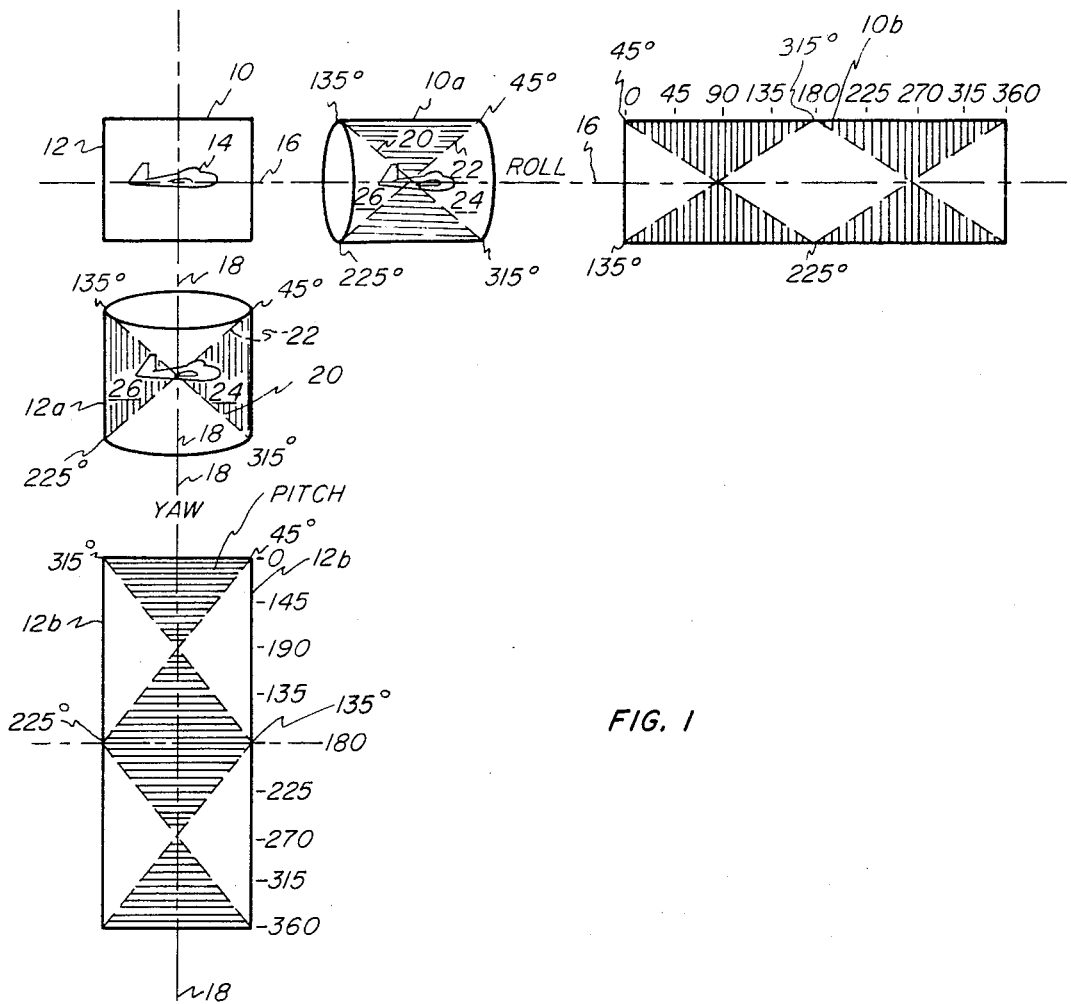
FIG. 1 is a diagrammatic view of the relative wrapping and positioning of two holographic films about normal axis through an object for the purpose of holographically recording all views of the object and also shows the films in unrolled position to explain and compare the data stored thereon, all in accordance with the invention.

Referring to FIG. 1 there is shown two holographic films 10 and 12 in composite 360° wrap-around position enclosing an airplane model 14. Additional exploded type views of films 10 and 12 are also shown in FIG. 1 including a separated roll-up of each film and a separated layout of each film. Thus, film 10 is shown in perspective wrap-around position at 10a and in layout position at 10b. The film 12 is shown in perspective wrap-around at 12a and in flat rectangular layout at 12b. The plane 14 has a horizonal tail-nose axis indicated by dotted line 16 which continues through the views 10a and 10b as a reference line. In the same manner a vertical axis 18 passes through the center of plane 14 and normal to the nose-tail axis 16 and continues as a reference line in the views 12a and 12b of film 12. The purpose of this arrangement in FIG. 1 is to facilitate an explanation of the complementary nature and function of the two holographic films 10 and 12 as will be described in detail hereinafter.

Considering view 10a of Film 10, FIG. 1, the dotted lines 20 and 22 indicate conical surfaces which are substantially the limits of field of vision with respect to pitch and yaw of the plane 14. Thus, one can see through film 10 for all views of roll, i.e., 0° to 360°. The yaw and pitch views are limited to the shaded conical annulus indicated and lying between the limits of 45° to 135° and 225° to 315° pitch and yaw. One cannot in film 10 see through the front conical plug indicated at 24 on the rear conical plug indicated at 26.

However, the latter areas 24 and 26 are readily viewed in film 12 as shown in view 12a by shading these portions. Thus, one can see through film 12 for all views of yaw, i.e., 0° to 360°. The pitch and roll views are limited to the compliment of film 10, i.e., to pitch and roll between 315° to 45° and 135° to 225°.

Views 10b and 12b show the films 10 and 12 flattened out and shaded to show the complimentary patterns of pitch such that in the two films all possible angles of pitch as well as yaw and roll are obtainable.

In accordance with the invention then two holographic films are made to enable the storing of data relating to all possible views of an object as if it were to be viewed at the center of a sphere which sphere could be turned to show continuous variation in attitude.

Figure 2:
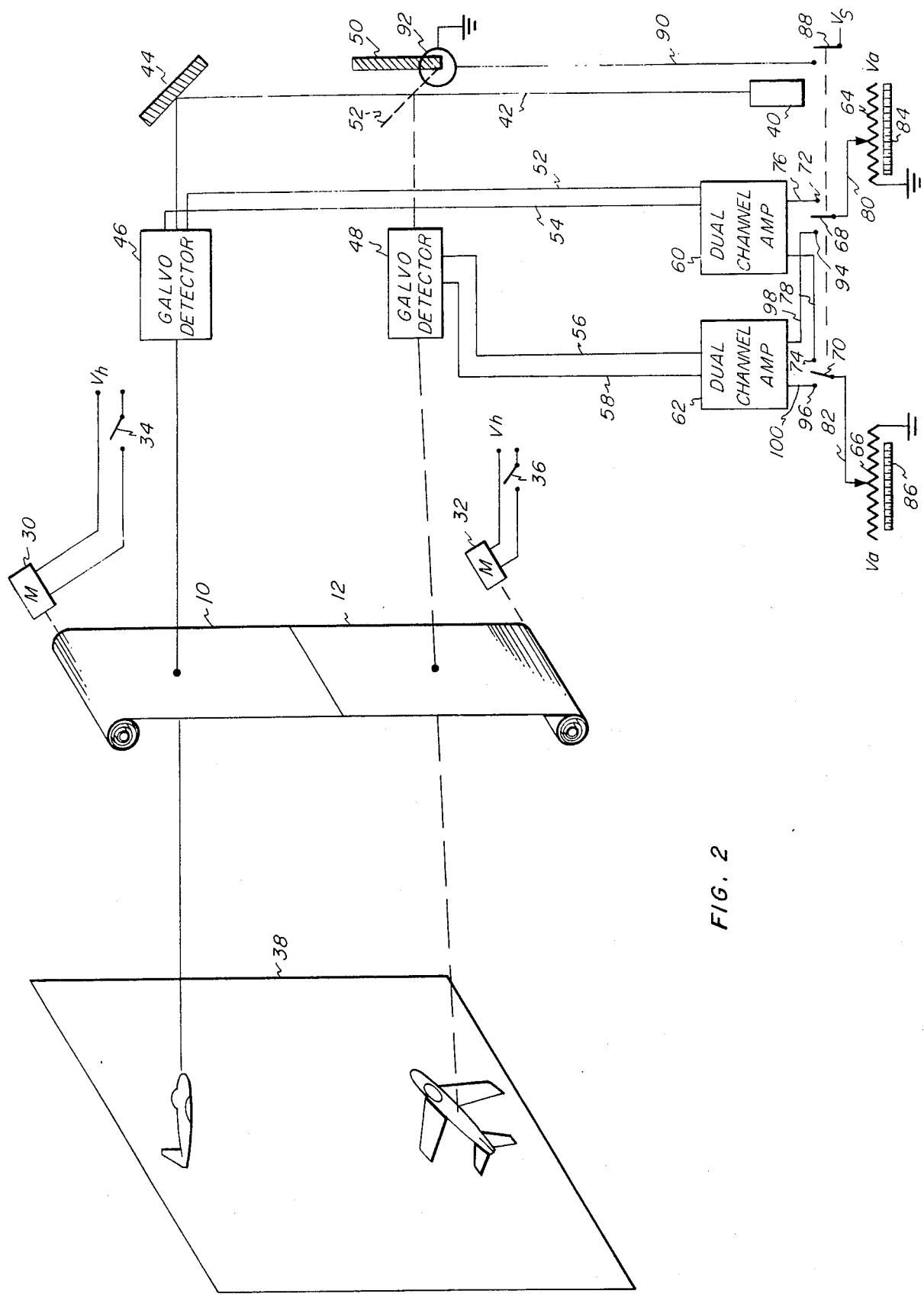
FIG. 2 is a schematic view of apparatus incorporating the invention and showing the means for selectively displaying views of the object stored on the holographic films.

To extract this data for display of any view of the object as desired and present continuously changing views if desired, we provide, in one preferred embodiment, the apparatus as shown in FIG. 2. In FIG. 2 the holographic films 10 and 12 are made part of a roll of pairs of holographic films such that any of various objects, such as various types of planes can be selected for display in any desired attitude. Drive means such as indexing motors 30 and 32 and switch means 34 and 36 connecting the motor to voltages $V_h$ indicated are connected to associated drive rollers on which the film is rolled to index the film. A display screen 38 is provided for display of a real image of a selected of the two holograms 10 and 12 responsive to the guidance of a laser beam to a selected portion of the selected film which portion contains image data for the desired object attitude.

In its preferred embodiment the laser and guidance system utilized with the films 10 and 12 include a laser source 40 providing a laser beam 42 which is reflected off a fixed reflector 44 to provide an input laser beam to an xy optical scanner 46 which in response to proper voltage inputs directs the laser ray to a selected portion of film 10. Since the data on films 10 and 12 are complementary and it is necessary to switch from one film to the other as explained hereinbefore to obtain all possible image views, means are provided to direct the laser beam 42 to film 12 instead of film 10 when necessary. In this respect a second xy optical scanner 48 is provided adjacent a rotatable reflector 50 which when rotated to operative position as indicated by dotted line position 52 interrupts the passage of beam 42 to reflector 44 and scanner 46 and instead directs the beam as an input to scanner 48 which in turn redirects the ray to that xy portion of film 12 necessary to get the desired object attitude data for image display on the screen 38. Any general scanning xy optical scanners suitable for deflecting a stationary light beam about orthogonal axes, so that a light beam incident upon the x-axis galvanometer is reflected onto the mirror of the y-axis galvanometer and then onto a projection plane, in this case the screen 38, is suitable.

The xy-scanners 46 and 48 are connected via lines 52 and 54 and 56 and 58 to respective dual channel amplifiers 60 and 62 which are energized from voltage sources, $V_n$, indicated, via variable resistance switching circuits represented by potentiometers 64 and 66, double throw switch elements 68 and 70. When the switches 60 and 70 are in the position indicated no energy is supplied to the amplifiers and associated scanners. When the switches are closed to the right on contacts 72 and 74 input voltages are applied via lines 76 and 78 to amplifier 60 in values dependent upon the setting of potentiometer wipers 80 and 82 which connect to the switch elements 68 and 70 as shown.

The application of selected voltages to the scanner 46 via the dual channel amplifier 60 adjusts the scanner x and y axis galvanometers (not shown) to redirect the laser beam 42 to that spot on film 10 which corresponds to the setting of the potentiometers 64 and 66. Scale means 84 and 86 may be used for setting the potentiometers for a particular point scan on film 10.

Ganged to the switches 68 and 70 is provided a reflector switch 88 which when closed applies voltage via a line 90 to a rotary solenoid 92 which rotates the reflector 50 to the dotted line position 52. The switch 88 is closed when the switch elements 68 and 70 are moved to the left to apply potentiometer voltage via contact points 94 and 96 and lines 98 and 100 to the dual channel amplifier 62 from whence the xy scanner 48 is operated to redirect the beam 42 to a spot on film 12 corresponding to the potentiometers settings.

The pair of dual channel amplifiers and the variable resistance switching circuits described hereinbefore comprise an instructor's control panel for applying selective analog voltages to the respective scanners 46 and 48 to direct an input laser beam to an xy area of each hologram film depicting a desired object attitude. The instructor's control panel also includes the switch means 88 for actuating the movable reflector 50–52 to switch the laser beam 42 between the scanners 46 and 48 as desired to select the one of said hologram films on which the desired object attitude may be viewed.

Figure 3:
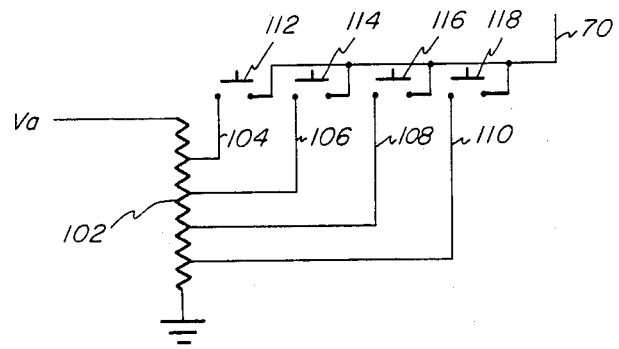
FIG. 3 is a schematic view of a modification of a switching circuit included in the apparatus of FIG. 2.

It is to be understood that in commercial production more sophisticated circuitry may be employed. For example, the potentiometers 64 and 66 could be replaced each by pluralities of fixed resistance circuits and press button switches with voltage data or image attitude data inscribed on each button. Such an arrangement is suggested in FIG. 3 where a potentiometer 106 is tapped at 104, 106, 108 and 110 to supply different voltages to respective switches 112, 114, 116 and 118, any of which can be closed to provide a desired voltage to switch 70. A similar arrangement can be used for energizing switch 68.

It is also to be noted that the xy scanners which normally are driven by dual channel amplifiers can also be driven with any combination of single channel drivers, or a random-access driver and ramp driver.

Other various changes in the details, material and arrangements of parts, which have been described and illustrated in order to explain the nature of the invention, may be made by those skilled in the art within the principle and scope of the invention as expressed in the appended claims.

What is claimed is:

1. A holographic object recognition trainer for selective visual display of an object as a real image at continuously variable attitudes comprising in combination:
   a. first and second circularly cylindrical holographic films made in wrap-around 360° fashion about two axes of the object, the axes being normal to each other to store all views of the object as it rotates through 360° respectively about said two axes; two spaced rollers; said films being joined together and stretched between said rollers;
   b. an xy optical scanner for each film, each scanner being positioned to scan an associated one of said films from an associated input laser beam;
   c. a laser beam source for producing a laser beam;
   d. a stationary reflector for passing said laser beam as an input laser beam to one of said optical scanners;
   e. a movable reflector and associated actuator for moving said movable reflector into the path of said laser beam at a point to interrupt the passage of said laser beam to said stationary reflector and to pass the beam as an input laser beam to a second optical scanner;
   f. an instructor's control panel including a pair of dual channel amplifiers and variable resistance switching circuits for applying selective analog voltages to said respective scanners to direct an input laser beam to an area of each hologram depicting a desired object attitude, said laser beam at said hologram films having a cross-sectional area which is small compared to the size of each hologram film, and also including switch means for actuating said movable reflector to switch said laser beam between said scanners as desired to select the one of said films on which the desired object attitude may be viewed.

2. Apparatus according to claim 1 wherein
   a. said movable reflector and associated actuator being a mirror and a rotary solenoid connected to rotate said mirror into the laser beam path when said rotary solenoid is actuated.

3. Apparatus according to claim 2
   a. said xy optical scanners comprising two galvanometer type xy light beam reflectors each responsive to x and y channel analog voltage inputs to orient the laser beam onto its associated film;
   b. said variable resistance switching circuits including a pair of calibrated adjustably variable potentiometers for producing selected x and y analog voltages, a pair of switches movable to one position to connect said *xy* voltages through one of said channel amplifiers to the scanner operating on said first holographic film and operable to a second position to pass said *xy* voltages through the other of said channel amplifiers to the scanner operating on said second holographic film, and a power solenoid switch ganged to said pair of switches to energize said rotary solenoid when said switches are in said second position.

4. Apparatus according to claim 1 a. said object being an aircraft;
b. said axes including the tail to nose axis of said aircraft and an axis therethrough normal to said nose-tail axis to thereby produce on said two hologram films all possible attitudes of said plane in yaw, pitch and roll such that variable attitudes may be progressively shown via said films and instructor's control panel.

\* \* \* \* \*